No. 624,448. Patented May 9, 1899.
T. & J. BROADBENT.
NUT LOCK.
(Application filed Nov. 22, 1898.)

(No Model.)

Witnesses.
H. Dennison.
C. A. H. McAdam.

Inventors.
T. Broadbent
J. Broadbent
by Fetherstonhaugh & Co.
Attys.

THE NORRIS PETERS CO., PHOTO-LITHO., WASHINGTON, D. C.

UNITED STATES PATENT OFFICE.

THOMAS BROADBENT, OF TORONTO, CANADA, AND JAMES BROADBENT, OF MADISON, WISCONSIN.

NUT-LOCK.

SPECIFICATION forming part of Letters Patent No. 624,448, dated May 9, 1899.

Application filed November 22, 1898. Serial No. 697,160. (No model.)

*To all whom it may concern:*

Be it known that we, THOMAS BROADBENT, molder, of the city of Toronto, in the county of York, in the Province of Ontario, Canada, and JAMES BROADBENT, farmer, of the city of Madison, in the county of Dane, in the State of Wisconsin, have invented certain new and useful Improvements in Nut-Locks, of which the following is a specification.

Our invention relates to improvements in nut-locks; and the object of the invention is to design a simple, cheap, efficient, and indestructible nut-lock; and it consists, essentially, of a metal washer-plate made, preferably, of corresponding contour to the sides of the nut and having a flat spring-arm formed integrally therewith and designed to normally extend parallel with the bolt, the outer end being bent and designed to engage with a notch in the end of the bolt, as hereinafter more particularly explained.

Figure 1:
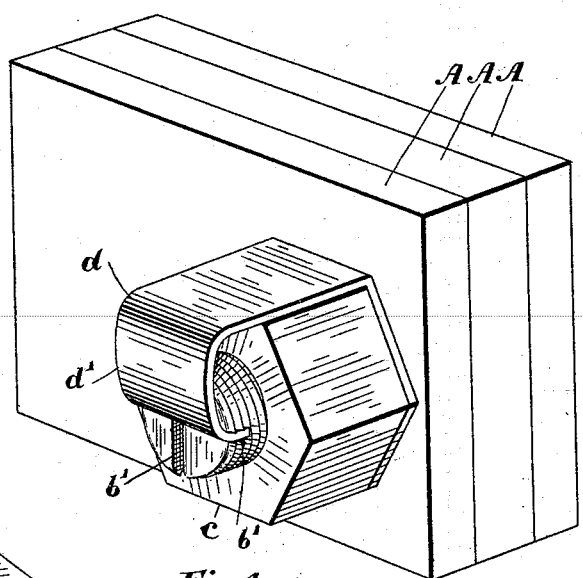
Figure 3:
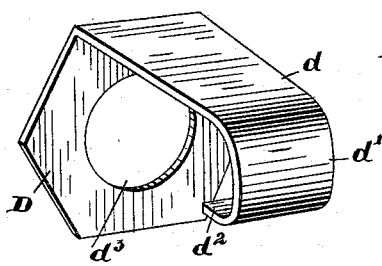
Figure 4:
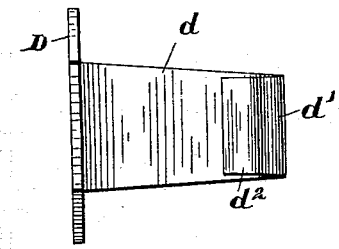
Figure 2:
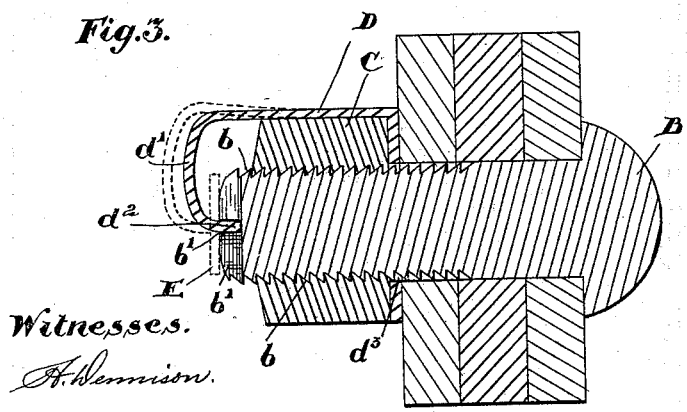

Figure 1 is a perspective view of three plates held together by a bolt and nut, the nut end of the bolt being only shown with the nut and nut-lock in position. Fig. 2 is a section through Fig. 1. Fig. 3 is a perspective detail of the nut-lock. Fig. 4 is a plan view looking from the inside of the nut-lock.

In the drawings like letters of reference indicate corresponding parts in each figure.

A A A are three plates, which are secured together by the bolt B, the threaded end $b$ of which is provided with a nut C. The nut in this case is a hexagonal nut. Before the nut is placed on the bolt, however, the washer-plate D is placed in position. The washer-plate D is provided with an arm $d$, which is tapered, as shown, and is narrower than any of the sides $c$ of the nut C, as will be seen in reference to Fig. 1.

The tapered arm $d$ extends parallel with the bolt and has a curved outer end $d'$. The taper ends at the bottom of the curved outer end, the remaining inwardly-extending portion $d^2$ of the arm being straight, not tapered—that is, having the sides parallel.

The washer D has a center hole $d^3$, through which the bolt extends. The bolt is provided at the end, preferably, with two cross-notches $b'$, crossing the center of the bolt on the end.

In order to screw the nut home, the wrench may be placed over the nut, even over the side in which the arm extends, as such arm is narrower than the sides, as hereinbefore stated, and when the nut and washer have been brought in proximity with the surface of the plate A a small plate E, as indicated in dotted lines in Fig. 2, is placed on the end of the bolt, so as to prevent the end $d^2$ dropping into the notch $b'$. As soon as the nut has been screwed perfectly home against the plate and the end $d^2$ is on a line with the notch $b'$ the plate E may be driven out in any suitable manner, whereupon, as the arm is a spring-arm, it will spring in from the position shown in dotted lines in Fig. 2 to that shown in full lines—that is, into the notch $b'$—thereby holding bolt and nut securely locked together.

We are aware that nut-locks have been devised in which lugs and posts have been used to extend into a notch at the end of the bolt or to grip a flattened end of the bolt, and we do not lay claim, broadly, to any such device in connection with said plates for the nut for holding such devices in position. As far as we are aware, however, in these devices either the nut-lock is destroyed after once being used or the nut is weakened. In our own nut-lock, however, there are none of these defects, and it will be seen that by the fact of having the washer extending inside the nut itself and provided with an arm forming portion of such washer-plate the parts are frictionally held in a much better way than in any device of which we are aware.

Another advantage arising from the use of our nut-lock is that it can be used over and over again, as it is only necessary to use any simple prying device in order to remove the end $d^2$ of the spring-arm out of the notch $b'$, when the plate E may be placed back in position and the nut unscrewed. It will be seen in our device also that even when the end of the bolt comes flush with the outer surface of the nut, or even slightly in, the end of the spring-arm, being parallel, will extend into the notch, which it would not do if the arm were tapered to the very end.

What we claim as our invention is—

1. The combination in a nut-lock, with a bolt having a kerf in the end thereof and a nut threaded on said bolt, of a washer adapted to be placed on the bolt below the nut and an arm extending therefrom, the end of said arm being bent back upon itself its end extending and terminating in alinement with the axis of the bolt, the tip of said end being adapted to engage the kerf in said bolt, substantially as described.

2. The combination with the bolt provided with a cross notch or notches and the nut fitting thereon, of the washer-plate corresponding in form to the sides of the nut and having a tapered spring-arm narrower than any side and provided with a curved outer end having a straight tip designed to extend inwardly in axial alinement with said bolt and to fit into the notch on the end of the bolt as and for the purpose specified.

THOMAS BROADBENT.
JAMES BROADBENT.

Witnesses as to Thomas Broadbent:
  B. BOYD,
  WALTER HARRIS.
Witnesses as to James Broadbent:
  RALPH C. VERNON,
  WM. C. PETERSON.